May 28, 1957  S. S. BROWN  2,793,648
HIGH PRESSURE DUMP MECHANISM
Filed April 5, 1954
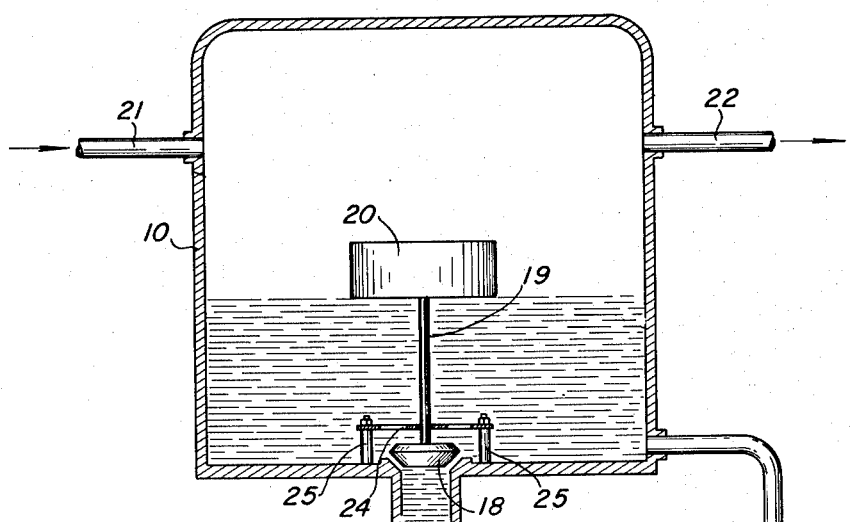
FIG. 1.
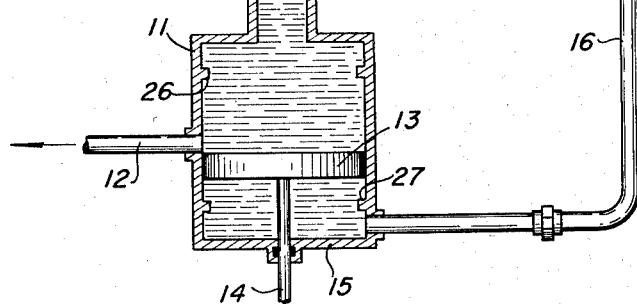
FIG. 2.
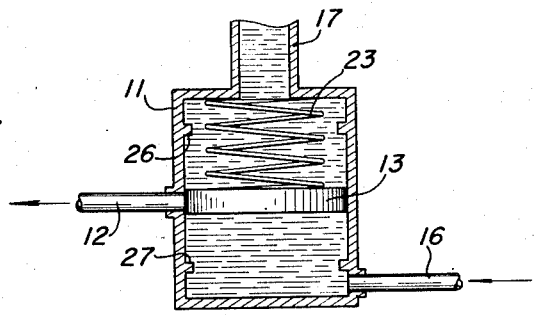
INVENTOR.
Stephen S. Brown,
BY *Melvin F Fincke*
ATTORNEY.

2,793,648
HIGH PRESSURE DUMP MECHANISM

Stephen S. Brown, Houston, Tex., assignor, by mesne assignments, to Esso Research and Engineering Company, Elizabeth, N. J., a corporation of Delaware Application April 5, 1954, Serial No. 421,150

4 Claims. (Cl. 137—184)

This invention relates to the art of dumping liquids which are under a high pressure. More particularly, this invention relates to a system for dumping high pressure liquids which utilizes the pressure within the high pressure tank containing the liquid for opening a valve for dumping the liquid without the use of diaphragm-type mechanisms thereby eliminating the disadvantages inherent in the diaphragm-type valve mechanisms.

In the production of crude oil from high pressure wells, it is quite often the procedure to pass the crude oil from the high pressure wells into a tank or separator. The crude oil usually consists of gaseous and liquid components. The liquid component settles in the separator and the gaseous component is conducted from the separator by means of a gas conduit, to be sold as natural gas or vented to the air and burned. The dumping of the liquid is usually controlled by a float which operates a valve for opening a liquid outlet. Because of the extremely high pressure within the separator, which might reach as high as 5,000 lbs. per square inch, the float does not have sufficient buoyancy to open the valve directly. It has been found that to open a valve of even the smallest diameter a float is required which is much too large to be practical. It has been the practice in the industry, therefore, to employ a low pressure diaphragm-type dump valve, the valve being operated by a low pressure gas supply system. The low pressure gas is obtained either by reducing the high pressure gas component of the crude oil and using it as a diaphragm-type valve operating medium or by using an external source of low pressure gas supply. However, the low pressure operating gas for the conventional dumping mechanisms is extremely difficult to obtain due to freezing problems inherent in attempting to reduce high pressure gas to the pressure which the low pressure diaphragm-type dump valve requires. The freezing quite often plugs up the gas supply system thus preventing the proper operation of the discharge valve. It is desirable, therefore, to devise a high pressure dumping system which is self-contained and does not need any external source of energy, such as the low pressure gas normally employed.

It is an object, therefore, of this invention to provide a high pressure dumping assembly which does not need an external source of energy and is entirely self-contained.

Briefly described, my new system includes a means for utilizing the high pressure present within the high pressure tank for operating a pressure differential piston. A means is provided for transmitting the lower pressure developed by the pressure differential system to the underside of a valve which normally is closed due to the high pressure pressing down on said valve thereby preventing the flow of liquid from the tank. By the provision of the upward pressure working on the dumping valve, a relatively small differential pressure exists across the dumping valve. The foregoing system, therefore, necessitates the use of a float which when a predetermined amount of liquid is contained within the tank, has a buoyancy which need only be sufficient to overcome the relatively small differential pressure across the dump valve. The means for developing a differential pressure may be in the form of a piston having one side effective area greater than the other side area, or it may be in the form of a piston with both sides having the same area but with one side being influenced by a spring so as to operate as a differential piston.

For a more complete understanding of the invention reference may be made to the accompanying drawings, in which:

Fig. 1 is an assembled view of the apparatus generally in vertical section; and

Fig. 2 is a vertical sectional view of a second embodiment of the differential pressure generating system.

In Fig. 1 my new high pressure dumping mechanism consists of a tank or separator 10 into which a high pressure substance is conducted by means of conduit 21. This substance under high pressure consists of gaseous elements and liquid elements. The gas is conducted from said tank 10 by means of conduit 22, while the liquid settles to the bottom of the tank. In my new system I provide a liquid-filled piston housing 11 having a liquid outlet 12. This liquid outlet 12 is normally closed by means of a piston 13, said piston being movable under pressure within the piston housing 11. Stops 26 and 27 limit the piston movement. In Fig. 1, the piston 13 has connected thereto a piston rod 14, said rod extending through the bottom 15 of the piston housing 11. The provision of a rod connected to the underside of piston 13 provides a smaller liquid exposed area on the underside of piston 13 than is exposed on the upper side of piston 13. Interconnecting the tank 10 with the piston housing 11 is a liquid conduit 16. This liquid conduit serves to transmit the high pressure within the tank 10 to the piston housing 11. The high pressure enters said piston housing 11 at a point in said housing below the piston 13 thereby subjecting the lower part of piston 13 to the same pressure as is present in the tank 10. This pressure may be as high as 4,000 to 5,000 lbs. per square inch. Since the force exerted on the side of the piston opposite from the side subjected to the high pressure within the tank is the same as the force on the underside of the piston and the area is greater on the upper side of piston 13, the pressure developed in the piston housing above the piston cylinder 13 is less than that below the piston cylinder 13. This lower pressure is transmitted to the underside of valve plug 18 through conduit 17. Therefore, the pressure differential across valve plug 18 is the difference between the high pressure within tank 10 and the lower pressure working on the underside of valve 18. From the foregoing it can be seen that the buoyant force necessary to open valve 18 need only be equivalent to or greater than the pressure differential across the valve plug 18. Connected to the valve plug 18 is a valve stem 19 which is in turn connected to a float 20. Float 20 is of sufficient buoyancy to exert enough force to open valve plug 18 when a predetermined amount of liquid is contained within the tank or separator 10. The movement of the float and valve system is resistricted to an up-down movement by retaining member 24 which is attached to tank 10 by nut and bolt arrangement 25.

In Fig. 2, I show a modification of the pressure differential generating system. As shown in Fig. 2, in place of the rod of Fig. 1, I position a compression spring 23, which compression spring exerts a force on the upper part of piston 13. Hence, as in Fig. 1, the pressure transmitted through conduit 17 is less than the pressure against the underside of piston 13.

In operation, assume a liquid is contained in tank or separator 10 and assume that this liquid is under a 2,000 lb. per square inch pressure. This pressure is transmitted by means of conduit 16 to the under part of piston 13.

The force, equal to the pressure times the area, exerted on the bottom of the piston is transmitted through the piston to the liquid contained in the upper part of piston housing 11. If the piston of Fig. 1 is utilized, it can be readily seen that the area over which the force is distributed is greater above the piston than below said piston. If the system of Fig. 2 is utilized, the force above the piston 13 would be equal to the force below the piston 13 except that a resilient member such as a compression spring 23 is effective to reduce the pressure above the piston 13. Thus, by proper arrangement of the area of piston 14 in Fig. 1, or the spring tension in spring 23 in Fig. 2, a constant pressure is exerted by the piston against the bottom side of valve plug 18. For example, if the area or spring tension is adjusted so that the pressure above the piston 13 is 1900 lbs. per square inch, the total effective pressure on valve plug 18 becomes 2000 lbs. per square inch, which is the vessel pressure minus 1900 lbs. per square inch, which is the pressure in the top of piston housing 11 or 100 lbs. per square inch. If the liquid within the tank 10 rises, the buoyancy of the float will overcome the 100 pound differential pressure across the valve 18 thereby opening said valve. As soon as valve plug 18 is open the full pressure of 2000 pounds is exerted on piston 13 through conduit 17 on the top of the piston. Because of the greater top-side area of piston 13 in Fig. 1 or the spring tension in Fig. 2, a greater force is exerted on the top side of piston 13 than on the bottom side. Therefore, piston 13 will be moved downwardly exposing liquid outlet 12, allowing liquid to drain from the tank 10 through conduit 17 and out of liquid outlet 12. As soon as the liquid level has been lowered sufficiently, the float 20 will no longer support valve 18 in the open position. Valve 18 then closes and pressure on the top of the piston continues to bleed out through outlet 12 until the full vessel pressure of 2000 lbs. beneath the piston forces the piston upwardly, closing outlet 12 and re-exerting the 1900 pounds pressure on the bottom of valve 18.

For dumping large volumes of high pressure liquids, my new system can be used as a pilot means to allow high pressure liquids from outlet 12 to be utilized to open a high pressure piston-type valve of much larger dimensions.

I claim:

1. Apparatus for regulating the discharge of a liquid under high pressure comprising: a tank containing the liquid to be regulated; a piston housing filled with liquid and having a liquid outlet; a piston disposed within said piston housing for opening and closing said outlet; a rod connected to the underside of said piston, said rod extending through said piston housing; a first conduit interconnecting said tank and said piston housing in a manner so as to subject the underside of said piston to the same pressure as the pressure within said tank; a second conduit interconnecting said tank and said piston housing, the effective area of the underside of said piston to be less than that of the upper side of said piston; a valve plug, said valve plug being positioned so as to normally shut off pressure communication between said tank and said second conduit; a valve stem connected to said valve plug; and a float connected to said valve stem, said float being of sufficient buoyancy to open said valve plug when a certain amount of liquid is contained within said tank so as to subject the upper side of said piston to the full pressure within said tank thereby moving said piston to a position allowing the liquid to flow out of said tank through said second conduit and out said liquid outlet.

2. Apparatus for regulating the discharge of a liquid under high pressure comprising: a tank containing the liquid to be regulated; a piston housing filled with liquid and having a liquid outlet; a piston disposed within said piston housing for opening and closing said outlet; a compression spring arranged within said piston housing so as to exert a force against the upper side of said piston; a first conduit interconnecting said tank and said piston housing in a manner so as to subject the underside of said piston to the same pressure as the pressure within said tank; a second conduit interconnecting said tank and said piston housing, said second conduit being connected to said piston housing at a point above said piston, the net force exerted on the underside of said piston to be less than that on the upper side of said piston; a valve plug, said valve plug being positioned so as to normally shut off pressure communication between said tank and said second conduit; a valve stem connected to said valve plug; and a float connected to said valve stem; said float being of sufficient buoyancy to open said valve plug when a certain amount of fluid is contained within said tank so as to subject the upper side of said piston to the full pressure within said tank thereby moving said piston to a position allowing the liquid to flow out of said tank through said second conduit and out said liquid outlet.

3. A liquid dump mechanism comprising: a tank, a valve associated with said tank and subject to the pressure within said tank normally preventing any liquid contained within said tank from flowing from said tank; a housing containing a liquid; a conduit interconnecting said tank and said housing so as to subject the liquid in said housing to the same pressure as the pressure of any liquid in said tank; means contained within said housing for establishing a differential pressure in said housing; a second conduit interconnecting said tank and said housing, said valve cooperating with said conduit to control flow therethrough; and means connected to said valve for opening said valve when a given amount of liquid is contained within said tank.

4. A liquid dump mechanism comprising: a tank; a valve normally preventing liquid from flowing out of said tank; a liquid-filled piston housing having a liquid outlet; a piston within said housing for opening and closing said liquid outlet; a first conduit interconnecting said tank and said liquid-filled piston housing thereby subjecting one side of said piston to the pressure within said tank; means for establishing a lower pressure on the underside of said piston; a second conduit interconnecting said tank and said liquid-filled piston housing at the upper side of said piston; and a float connected to said valve having sufficient buoyancy to open said valve when a given amount of liquid is contained within said tank, allowing flow through said second conduit to the upper side of said piston.

No references cited.